United States Patent [19]
Ebert

[11] Patent Number: 6,024,418
[45] Date of Patent: Feb. 15, 2000

[54] AXLE REPAIR METHOD AND RELATED ASSEMBLY

[76] Inventor: James L. Ebert, 10003 Mudbrook Rd., Huron, Ohio 44839

[21] Appl. No.: 08/846,139

[22] Filed: Apr. 25, 1997

[51] Int. Cl.[7] .................................................. B22D 19/10
[52] U.S. Cl. .......................... 301/130; 301/132; 301/137; 29/402.13
[58] Field of Search ................................. 301/124.1, 126, 301/128, 130, 131, 132, 137; 29/402.06, 402.07, 402.08, 402.09, 402.11, 402.14, 402.13, 402.16

[56] References Cited

U.S. PATENT DOCUMENTS

| | | |
|---|---|---|
| 8,707 | 2/1852 | Phillips . |
| 101,586 | 4/1870 | Cluxton . |
| 262,733 | 8/1882 | Brule . |
| 639,178 | 12/1899 | Maddox . |
| 894,131 | 7/1908 | Frederick ............................ 301/132 |
| 1,076,471 | 10/1913 | Vanskiver . |
| 1,139,182 | 5/1915 | Henthorn et al. . |
| 1,379,558 | 5/1921 | Haffner . |
| 1,475,745 | 11/1923 | Bunger . |
| 1,480,223 | 1/1924 | Rocbechaud . |
| 1,547,444 | 7/1925 | Rankin et al. . |
| 2,700,208 | 1/1955 | Messimer . |
| 3,324,701 | 6/1967 | Shultz . |
| 3,715,935 | 2/1973 | Ebey . |
| 3,915,504 | 10/1975 | Bauer ..................................... 301/130 |
| 4,098,029 | 7/1978 | Shiets . |
| 4,363,522 | 12/1982 | Palovcik . |
| 4,417,462 | 11/1983 | Palovcik . |
| 4,455,732 | 6/1984 | Shiets . |
| 4,486,052 | 12/1984 | Taggart, Jr. . |
| 4,571,795 | 2/1986 | Shiets . |
| 4,674,163 | 6/1987 | Nugier . |
| 4,768,839 | 9/1988 | Spindler . |
| 4,792,080 | 12/1988 | Ferrari . |
| 4,820,089 | 4/1989 | Shiets . |
| 4,969,246 | 11/1990 | Shiets . |
| 4,997,321 | 3/1991 | Adams . |
| 5,077,882 | 1/1992 | Adams . |
| 5,125,146 | 6/1992 | Ferrari . |
| 5,228,182 | 7/1993 | Hart . |

*Primary Examiner*—Russell D. Stormer
*Attorney, Agent, or Firm*—Fay, Sharpe, Fagan Minnich & McKee, LLP

[57] ABSTRACT

A technique and related assembly for repairing axles such as large heavy duty axles for semitrailers and vehicles are disclosed. A single replacement spindle is utilized in conjunction with one of several sleeve components for the repair. The technique enables a wide array of axles to be easily repaired with a relatively small selection of components.

19 Claims, 9 Drawing Sheets

AXLE REPAIR METHOD AND RELATED ASSEMBLY

BACKGROUND OF THE INVENTION

The present invention relates to a method for repairing axles, particularly large heavy duty axles for semitrailers and vehicles. The invention also provides assemblies and components for repairing axles.

Large heavy duty trailer axles such as those utilized for semitrailers, are typically one-piece units having spindles integrally formed at each end of a generally hollow axle. Often these spindles become worn, threads on the spindle ends become damaged, or the spindles may fracture or break. Since the spindles are integral with the axle, it is necessary to replace the entire unit of axle and spindles. Such units are expensive and difficult to replace. Accordingly, there is a need for a method of repairing spindles or end portions of trailer axles.

Prior artisans have attempted a wide array of techniques for repairing damaged axles. Although satisfactory in most respects, even the most attractive techniques have several disadvantages. U.S. Pat. No. 4,455,732 to Shiets describes a method for rebuilding vehicle axles. The method requires a jig and a boring machine to form a concentric cylindrical cavity within the axle undergoing repair. Thus, in order to begin repair of an axle, the boring machine and jig must be transported to the vehicle or trailer and damaged axle. After repair, the machine and jig are shipped back. Alternatively, if the boring machine and jig are not transported, the damaged axle must be removed from the vehicle and brought to the boring machine and jig. After repair, the axle is shipped back to the vehicle and re-installed. As will be appreciated, typical boring machines are relatively expensive and difficult to transport. Moreover, operating such boring machines requires considerable training and expertise, thereby further adding to the difficulty and expense in repairing an axle. Furthermore, it may be necessary to provide a particular jig depending upon the specific axle in need of repair. Thus, not only must an assortment of jigs be provided, but a determination must be made as to the proper jig for each repair job. This further contributes to the complexity of the repair process. Accordingly, there is a need for a method of repairing axles which does not require boring axle ends and therefore, does not require the use of a boring machine and jig and the difficulties associated therewith.

Another approach to repairing axles is described in U.S. Pat. No. 4,792,080 to Ferrari. In this approach, an axle end is repaired by removing the damaged end portion and butt welding a new replacement end portion on to the axle. Although this technique is relatively straightforward and avoids the use of a boring machine, it requires the use of an axle-specific jig. In view of the wide array of axle configurations, particularly in the field of large heavy duty axles for semitrailers, it is burdensome for a repair facility to stock all jigs. Furthermore, there exists a potential for failure of a butt welded axle. This potential is of even greater concern for axles utilized in high load applications such as in many semitrailers. Accordingly, there is a need for a technique for repairing axles which does not require a jig, and which avoids butt welding a replacement axle portion.

SUMMARY OF THE INVENTION

The present invention achieves the foregoing objectives and provides, in a first aspect, a method for repairing an axle having a damaged spindle and a housing with an interior hollow region. The method comprises defining a cut plane along the housing, severing the damaged spindle from the housing along the cut plane, and providing a replacement spindle. The spindle is inserted within the cut end of the axle, and specifically, within the interior hollow region of the housing. One or more holes are formed in the housing near the inserted end of the spindle. The replacement spindle is then welded within the housing.

In another aspect, the present invention provides an axle assembly comprising an axle housing having an interior hollow region accessible from a distal end of the housing. The axle assembly also comprises a sleeve having an interior chamber that extends between opposite ends of the sleeve. The sleeve is positioned within the housing. The axle assembly further comprises a spindle that is positioned within the housing so that an end of the spindle projects outward beyond the distal end of the housing. At least one passageway is provided through the housing and sleeve. The components are all affixed to one another by plug welding through the passageway(s).

In yet another aspect, the present invention provides an axle assembly produced by a particular method. The method comprises providing an axle having a hollow housing and a separate spindle unit. The spindle is inserted into the housing. An aperture is formed through the housing. The spindle is welded to the housing by plug welding.

DESCRIPTION OF THE PREFERRED EMBODIMENTS

The present invention provides a replacement spindle, sleeve, and seal that are utilized in a repair method to readily and economically repair trailer and drive axles having damaged spindles. The present invention repair techniques and assemblies can be applied to trailer axles such as utilized in heavy duty semitrailers. The present invention repair techniques and assemblies can also be applied to certain vehicle drive axles such as those typically utilized in one ton truck chassis described below.

Figure 1:
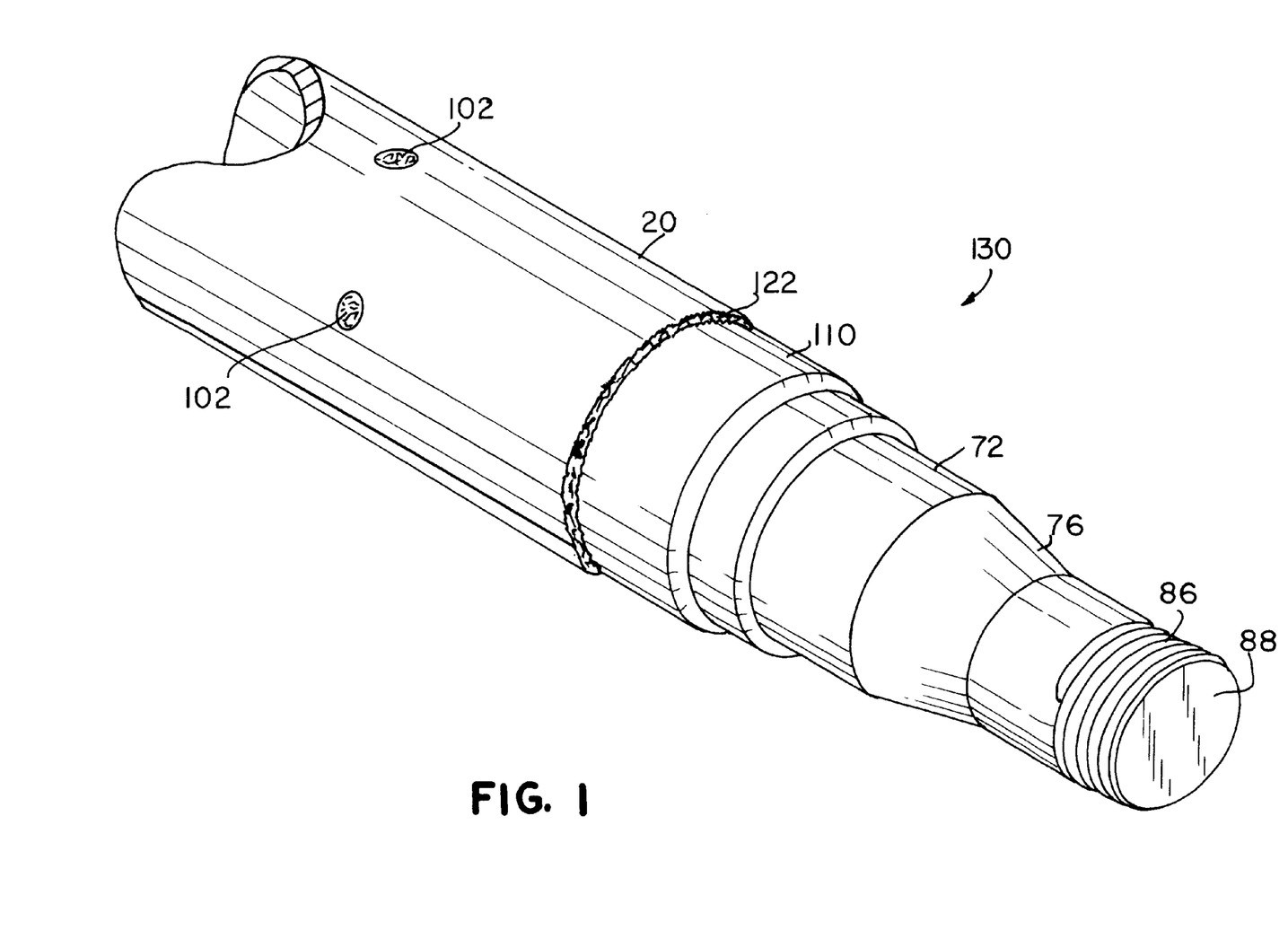
FIG. 1 is perspective view illustrating a preferred embodiment axle assembly in accordance with the present invention.

FIG. 1 illustrates a first preferred embodiment repaired axle assembly 130 in accordance with the present invention. The axle assembly 130 results from employing a repair technique in accordance with the present invention, to an axle in need of repair as follows.

Figure 2:
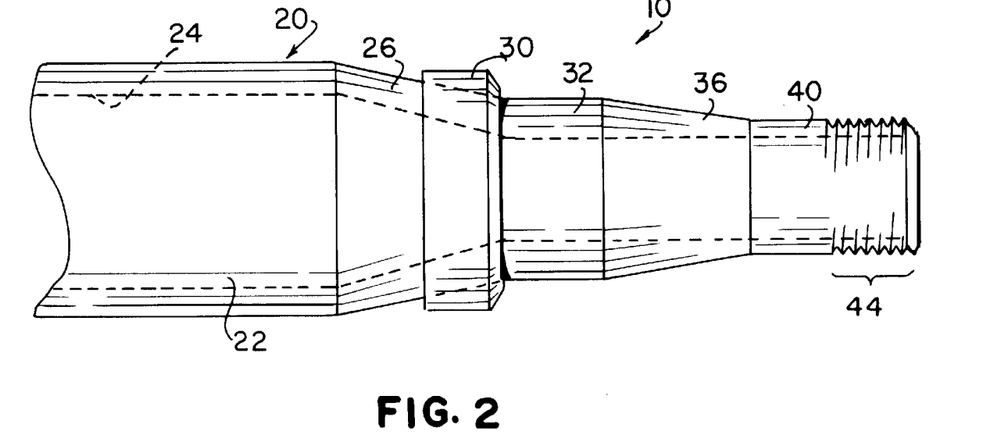
FIG. 2 illustrates a prior art axle assembly, and particularly an end thereof.

Referring to FIG. 2, a typical prior art trailer axle 10 is illustrated. The axle 10 comprises a generally cylindrical housing 20 providing an outer circumferential surface 22 and an inner, preferably circumferential, surface 24. The inner surface 24 defines an interior hollow region within the housing 20. It is to be understood that the interior hollow region is not necessarily cylindrical. That is, noncylindrical geometries may be utilized. The minimum dimension between opposing sides or regions of the inner surface 24 is referred to herein as the access span. For cylindrical geometries, this term refers to, or may be used interchangeably with, the inside or inner diameter of the hollow region. Extending from the housing 20 is a tapered portion 26. It will be seen that the inner surface 24 also tapers inwardly within the portion 26. The tapered portion 26 generally extends to a seal 30. Extending from the seal 30 is a medial portion 32. The medial portion 32 is generally cylindrical and nontapering. Extending from the medial portion 32 is a second tapered portion 36. A spindle 40 is located at the distal end of the axle 10, and provides one or more threads 46 within a threaded region 44 proximate the end 48 of the spindle 40. The inner surface 24 extending between the seal 30 and the end 48 is shown in FIG. 2 as cylindrical and nontapering.

It is to be understood that the present invention axle repair technique and assemblies, of which the preferred embodiments are described herein, may be utilized in conjunction with a wide array of axles and axle configurations. That is, the invention is not limited to the repair of the particular axle type illustrated in FIG. 2.

Figure 3:
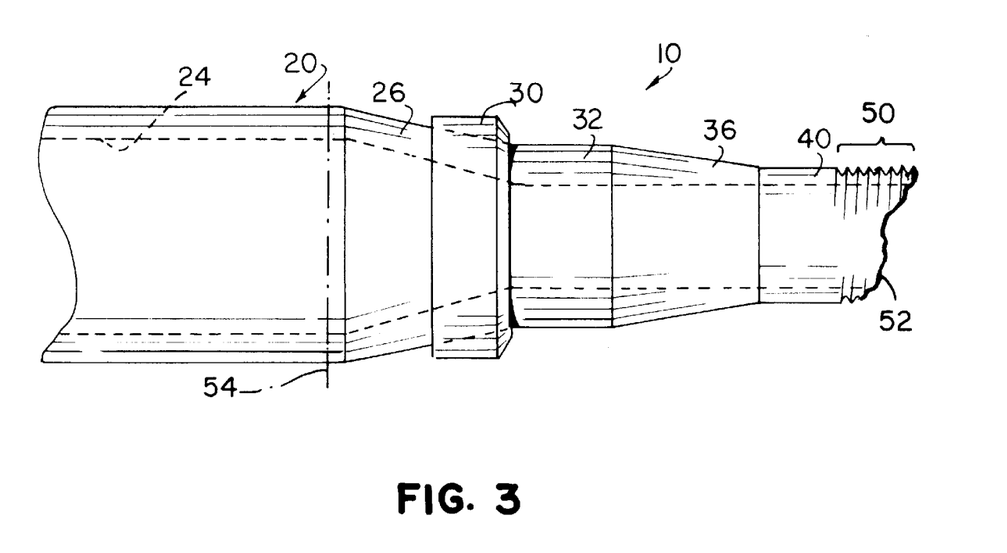
FIG. 3 illustrates the prior art axle assembly of FIG. 2 having a damaged spindle end.

FIG. 3 illustrates the typical axle assembly 10 in which the spindle 40 has been damaged. In FIG. 3, the particular type of damage shown is fracturing of the spindle 40 and severing of the spindle end 48. Accordingly, a damaged portion 50 is shown at which is located a fracture 52.

In accordance with the present invention, a cut plane 54 is defined along the damaged axle 10. The cut plane 54 is preferably defined along the housing 20 and most preferably as close to the tapered portion 26 as possible. The cut plane 54 intersects the interior hollow region of the housing 20. The cut plane 54 is also preferably oriented perpendicular to the cylindrical axis of the housing 20. A cutting or severing operation is then performed along the cut plane 54 to cut or otherwise separate the damaged portion of the axle 10, i.e. the damaged portion 50, from the housing 20. Such separation results in a cut face 56 as follows.

Figure 4:
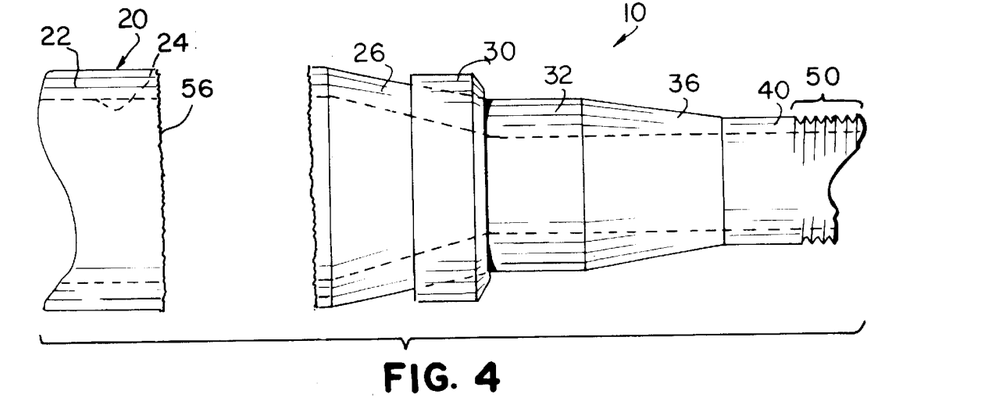
FIG. 4 illustrates the axle assembly of FIG. 3 in need of repair after a cutting operation in accordance with the present invention.

FIG. 4 illustrates the axle 10 after severing the damaged end portion along the cut plane 54 thereby forming the cut face 56 on the end of the housing 20. As will be understood, for a cylindrical and hollow housing 20, the cut face 56 is annular shaped. The damaged end portion is discarded or retained for scrap.

Figure 5:
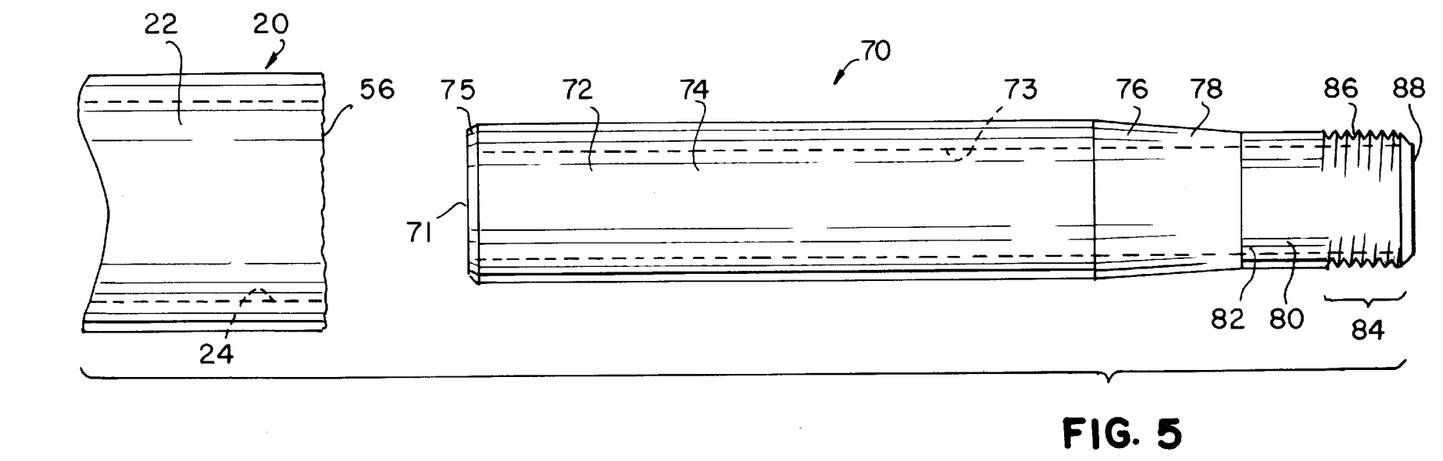
FIG. 5 illustrates a remaining portion of the prior art axle assembly and a replacement spindle in accordance with the present invention.

In furtherance of the present invention, a preferred embodiment replacement spindle 70 is provided as illustrated in FIG. 5. As described below, the replacement spindle 70 is inserted and positioned within the housing 20 of the axle 10 undergoing repair. The replacement spindle 70 comprises a main body 72 defining a proximal end 71 and a circumferential outer surface 74. A bevelled edge 75 is optionally provided between the end 71 and the outer surface 74. At the distal region of the main body 72, i.e. opposite the proximal end 71, is defined a tapered portion 76. The tapered portion 76 provides an outer surface 78. A spindle portion 80 extends from the distal region of the tapered portion 76 to a distal end 88. The spindle portion 80 provides a circumferential outer surface 82 and a threaded region 84 proximate the end 88. As will be appreciated, one or more threads 86 are provided in the threaded region 84. Typically, a cylindrical inner surface 73 extends along the length of the spindle 70 between the ends 72 and 88 to provide a hollow region or bore extending the length of the spindle 70. It is also possible to utilize a solid spindle which does not provide a hollow region or bore within its interior.

The outside diameter of the replacement spindle 70, particularly along the main body 72, is less than the inside diameter or access span of the axle housing 20. The preferred dimensions and proportions of the replacement spindle 70, and proportions relative to the housing 20, are described in greater detail below.

Figure 6:
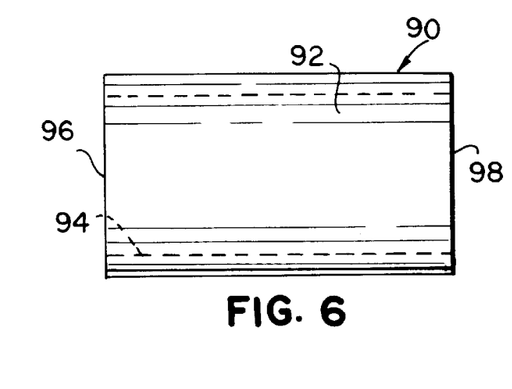
FIG. 6 illustrates a sleeve in accordance with the present invention.

Referring to FIG. 6, the preferred embodiment axle assembly also comprises a sleeve 90 that, together with the replacement spindle 70, is inserted within the housing 20. The sleeve 90 is preferably a cylindrical member defining an interior hollow cylindrical region. The sleeve 90 provides an outer circumferential surface 92, an inner circumferential surface 94, and opposite annular ends 96 and 98. The outside diameter of the preferred embodiment sleeve 90 is less than the inside diameter or access span of the housing 20. The inside diameter of the sleeve 90 is greater than the outside diameter of the main body 72 of the spindle 70. The particular dimensions and proportions of the sleeve 90 are described in detail below, in conjunction with those aspects of the replacement spindle 70.

Figure 7:
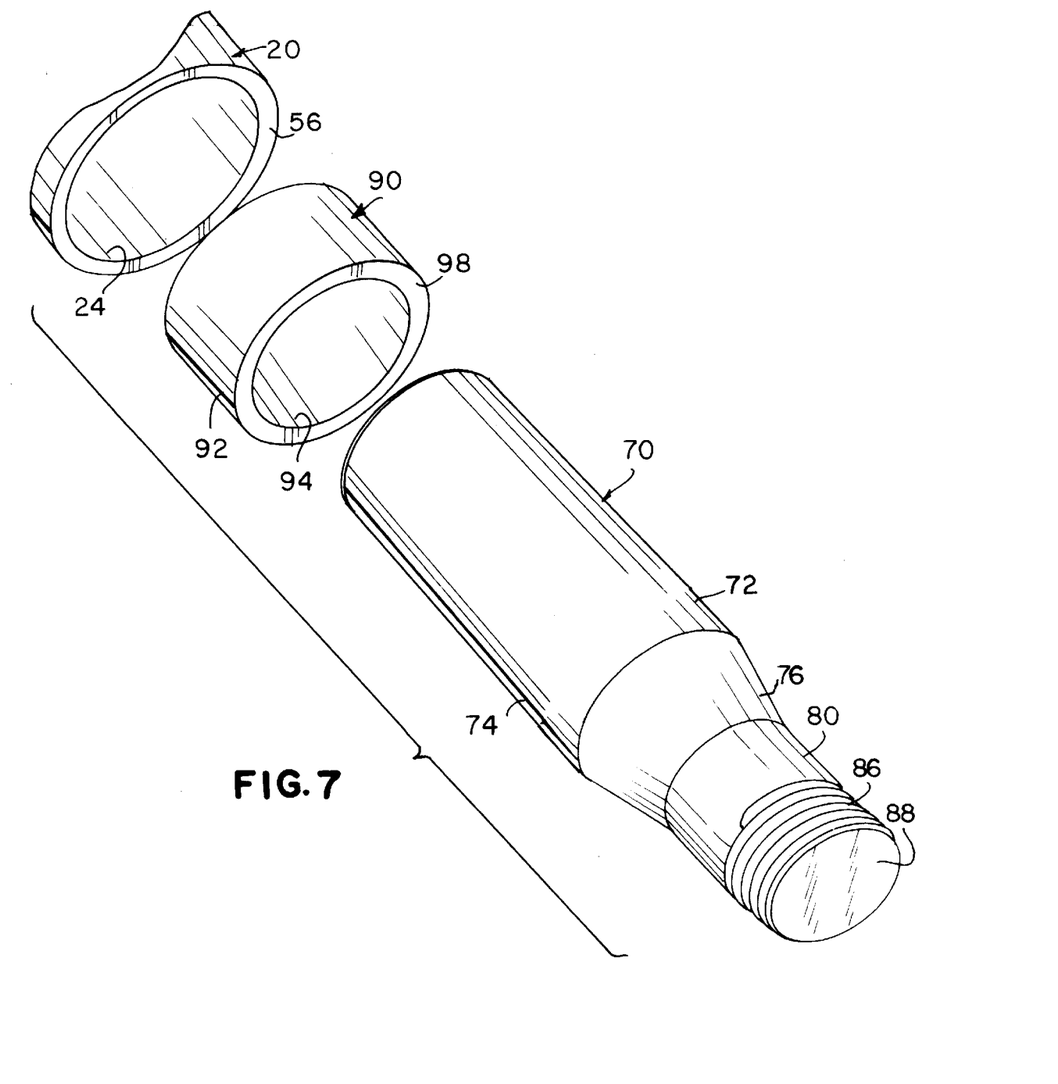
FIG. 7 is an exploded perspective view of the replacement spindle and sleeve components and their incorporation in the axle being repaired.

Referring to FIG. 7, the replacement spindle 70 and the sleeve 90 are inserted and positioned within the interior hollow region of the housing 20 of the axle in need of repair. In a first technique, the sleeve 90 is inserted into the opening of the exposed annular shaped cut face 56 of the housing 20 such that the outer circumferential surface 92 of the sleeve 90 is adjacent to, and preferably in contact with, the inner circumferential surface 24 of the housing 20. The replacement spindle 70 is then inserted within the sleeve 90, now disposed in the housing 20, so that the circumferential outer surface 74 of the main body 72 is adjacent to, and preferably in contact with, the inner circumferential surface 94 of the sleeve 90. This sequence may be reversed and a second preferred technique performed as follows. The sleeve 90 may be positioned over the replacement spindle 70 such that the inner circumferential surface 94 is adjacent to, and preferably in contact with, the circumferential outer surface 74 of the main body 72. The resulting assembly of spindle 70 and sleeve 90 is then inserted into the annular opening of the housing 20 so that the outer circumferential surface 92 of the sleeve 90 is adjacent to, and preferably in contact with, the inner circumferential surface 24 of the housing 20.

Figure 8:
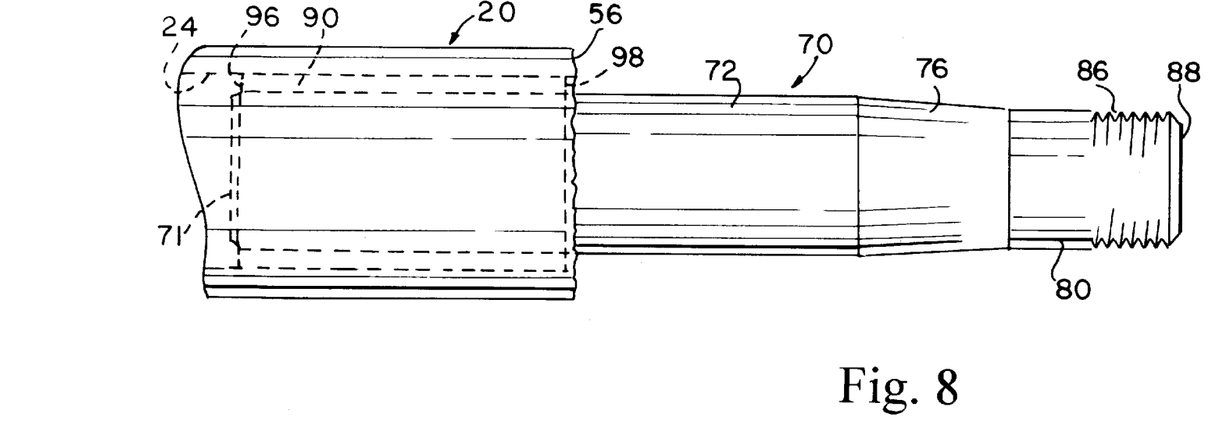
FIG. 8 illustrates the assembly of the axle undergoing repair, the sleeve, and the replacement spindle in accordance with the present invention.

FIG. 8 illustrates the resulting assembly with the housing 20, the spindle 70, and the sleeve 90 being appropriately and preferably positioned relative to one another. In this preferred embodiment, it will be seen that the annular end 98 of the sleeve 90 is flush or approximately so with the cut face 56 of the housing 20. Moreover, the replacement spindle 70 is disposed within the housing 20 and positioned relative to the sleeve 90 such that the proximal end 71 of the replacement spindle 70 is flush, or substantially so, with the other annular end 96 of the sleeve 90.

Figure 9:
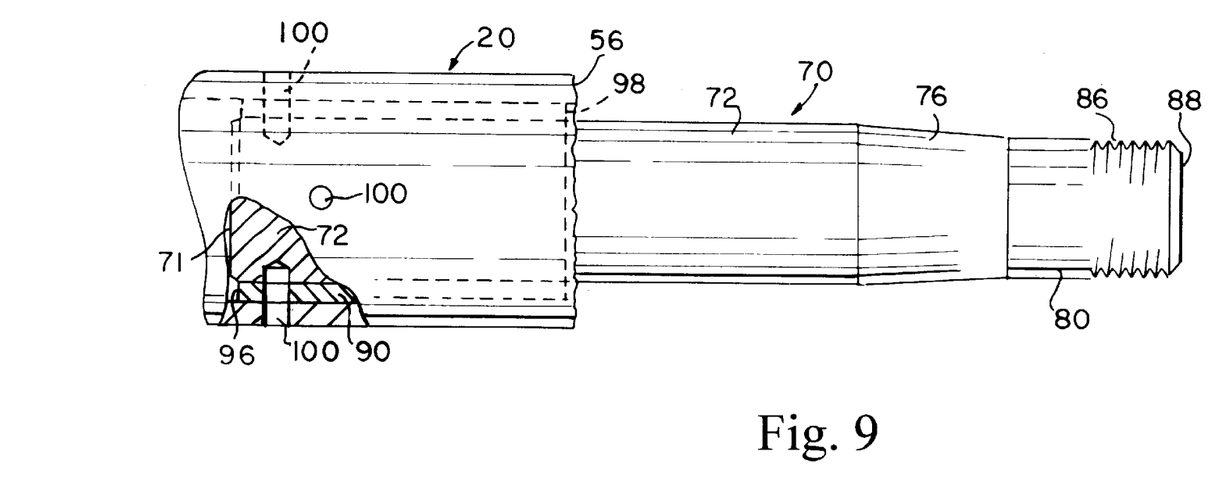
FIG. 9 illustrates a securing or welding operation performed upon the assembly of FIG. 8 in accordance with the present invention.
Figure 10:
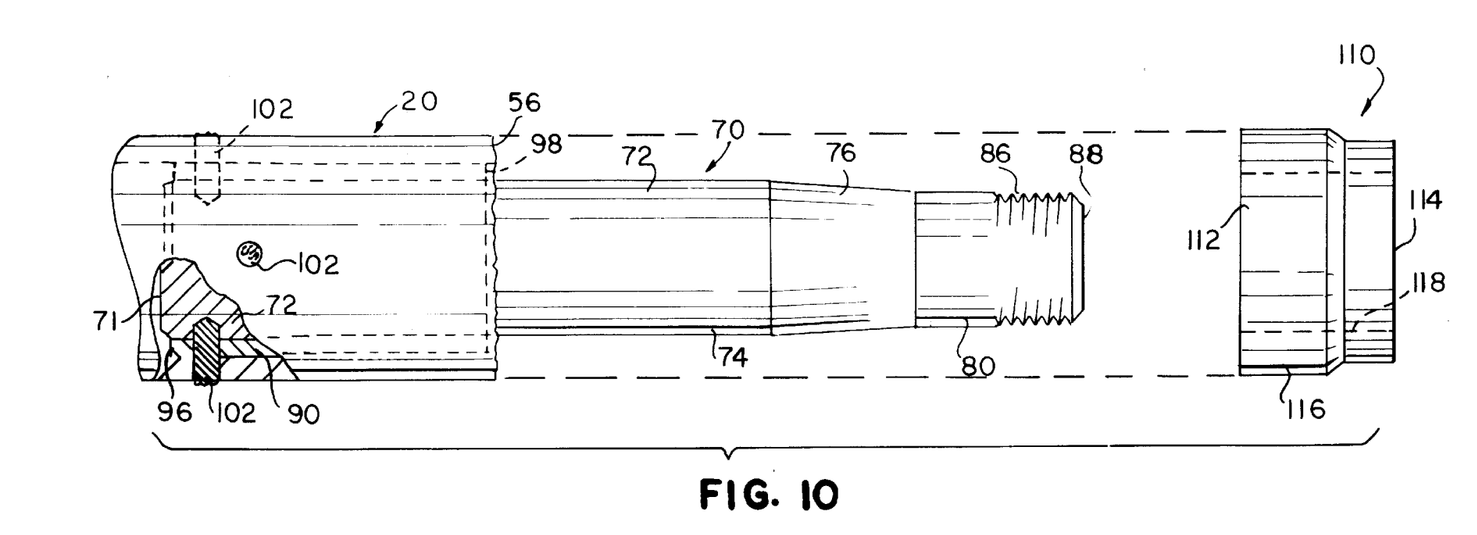
FIG. 10 illustrates positioning a seal for engagement with the assembly of FIG. 9.

Once appropriately positioned, the components 20, 70, and 90 are secured to one another as follows. Radially oriented passageways or holes 100 are formed through the wall of the axle housing 20 at a location adjacent to the inserted end of the spindle 70, i.e. the end 71. As illustrated in FIG. 9, the holes 100 preferably extend through a wall of the housing 20, a wall of the sleeve 90, and into the main body 72 of the spindle 70. The spindle 70 and the sleeve 90 are secured to the housing 20, and to each other, by plug welding through the holes 100 in the housing 20. FIG. 10 illustrates an effective amount of welding material 102 disposed within the holes 100. The deposition of welding material 102 in the openings 100 effectively secures and engages the spindle 70, the sleeve 90, and the housing 20 to one another.

Referring further to FIG. 10, a cylindrically shaped seal 110 is optionally provided. The seal 110 provides an annular mating face 112, an opposite annular seal face 114, an outer surface 116, and a generally continuous and smooth interior circumferential surface 118. The seal 110 is placed over the main body portion 72 of the spindle 70 and positioned against the housing 20 so that the mating face 112 is adjacent to, and preferably contacting, the cut face 56 of the housing 20. The seal 110 is then butt welded against the exposed cut face 56 of the housing 20. It is preferred that the interior surface 118 of the seal 110 is adjacent to, and most preferably contacting, the outer circumferential surface 74 of the main body 72 of the spindle 70. The seal width, that is the distance between the seal faces 112 and 114, primarily depends upon the length of axle cut or removed from the main axle unit and the configuration of the original spindle end.

Figure 11:
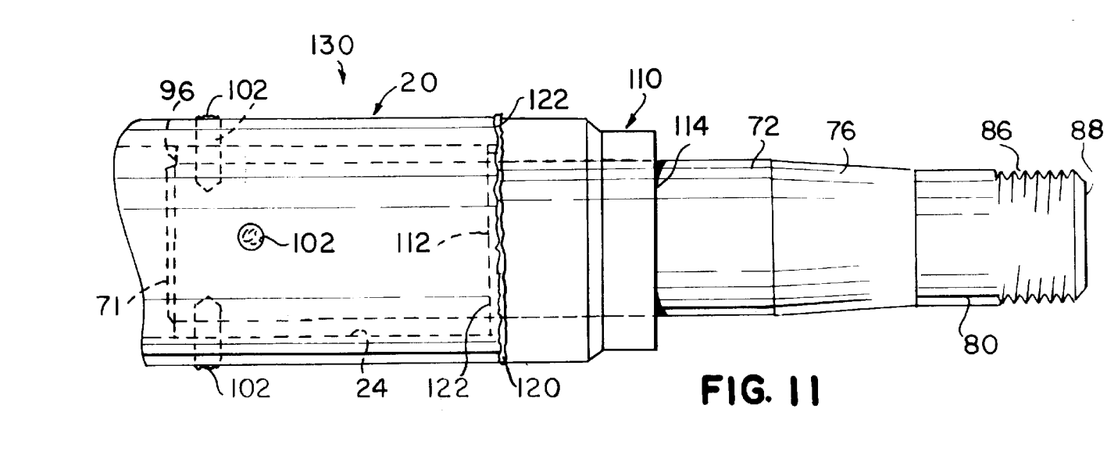
FIG. 11 illustrates a repaired axle assembly in accordance with the present invention.

FIG. 11 illustrates the first preferred embodiment repaired axle assembly 130 upon butt welding the seal 110 to the housing 20. An effective amount of weld material 122 is deposited along the interface between the cut face 56 and the mating face 112 of the seal 110.

Figure 12:
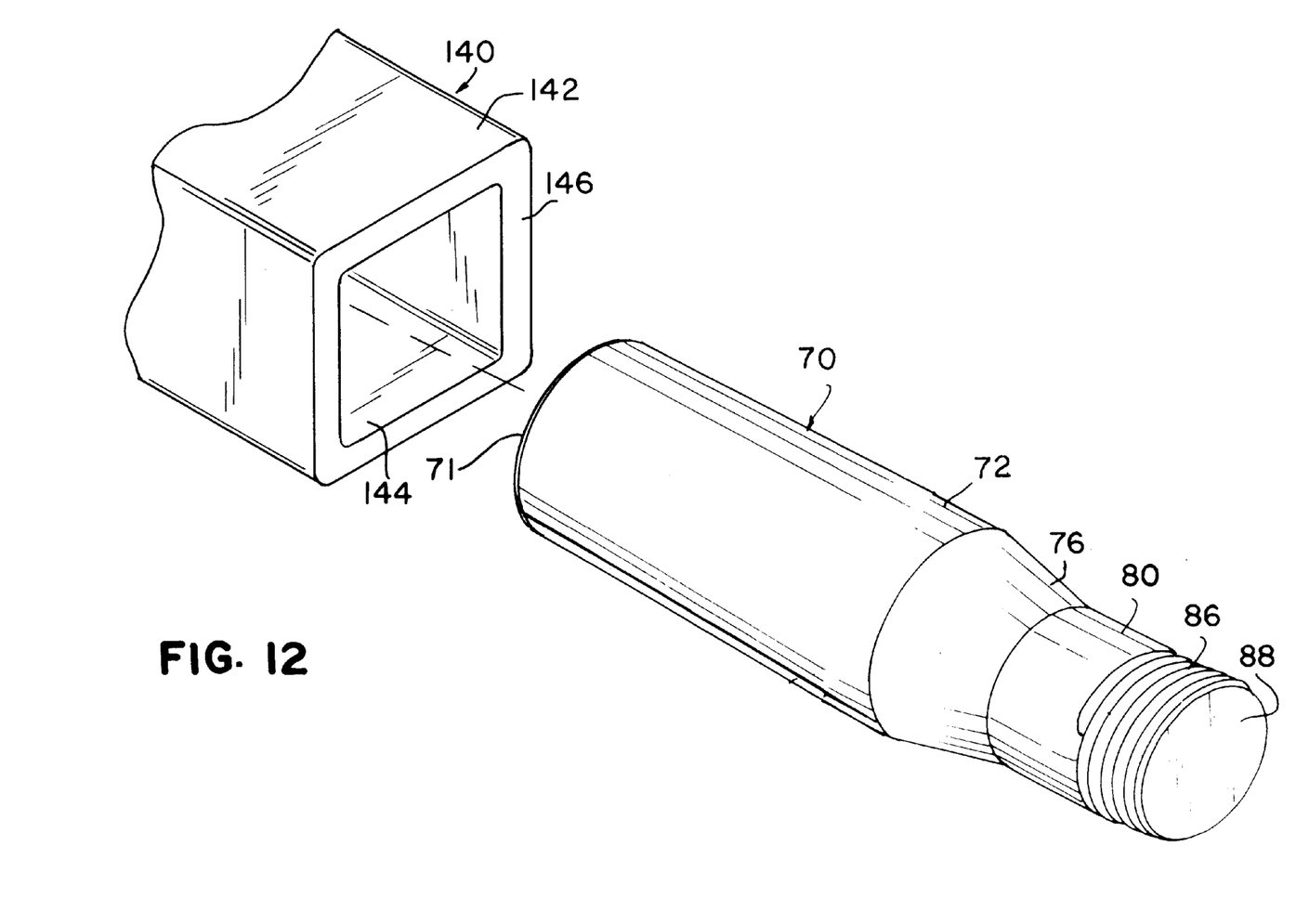
FIG. 12 is a perspective view of another axle assembly undergoing repair in accordance with the present invention.

The axle housings may comprise other configurations as opposed to being cylindrical. Rectangular and square shaped housings are known. FIG. 12 illustrates a second preferred embodiment axle assembly in accordance with the present invention. This second embodiment contemplates repair of an axle having a housing 140 with a square shaped cross-section or profile. The square housing 140 provides an outer surface 142 and an inner surface 144. The interior hollow region within the housing 140 may be cylindrically shaped, or may define a noncylindrical chamber. The minimum distance between opposing regions of the inner surface 144 defines an access span 145. FIG. 12 illustrates the square housing 140 after cutting or separating the damaged portion from the housing 140. The resulting cut surface defines a cut face 146. In accordance with the present invention, a replacement spindle, similar to the previously described replacement spindle 70, is inserted within the cut end of the housing 140 through the cut face 146. If the outer diameter of the spindle 70 along the main body 72 is not large enough to engage the interior region of the housing 140, such as by contacting the inner surface 144, an appropriately sized sleeve may be used, similar to the previously described sleeve 90. The resulting assembly is then subjected to the remaining steps of the present invention repair technique whereby one or more holes are formed through the axle housing, through a sleeve if present, and into the replacement spindle 70. The components are further secured to one another by plug welding as previously described. In some instances, it may be possible to tack weld the replacement spindle 70 to the housing 140. An optional seal may be disposed over the spindle 70 and placed in abutting relationship with the cut face 146 of the housing 140.

Figure 13:
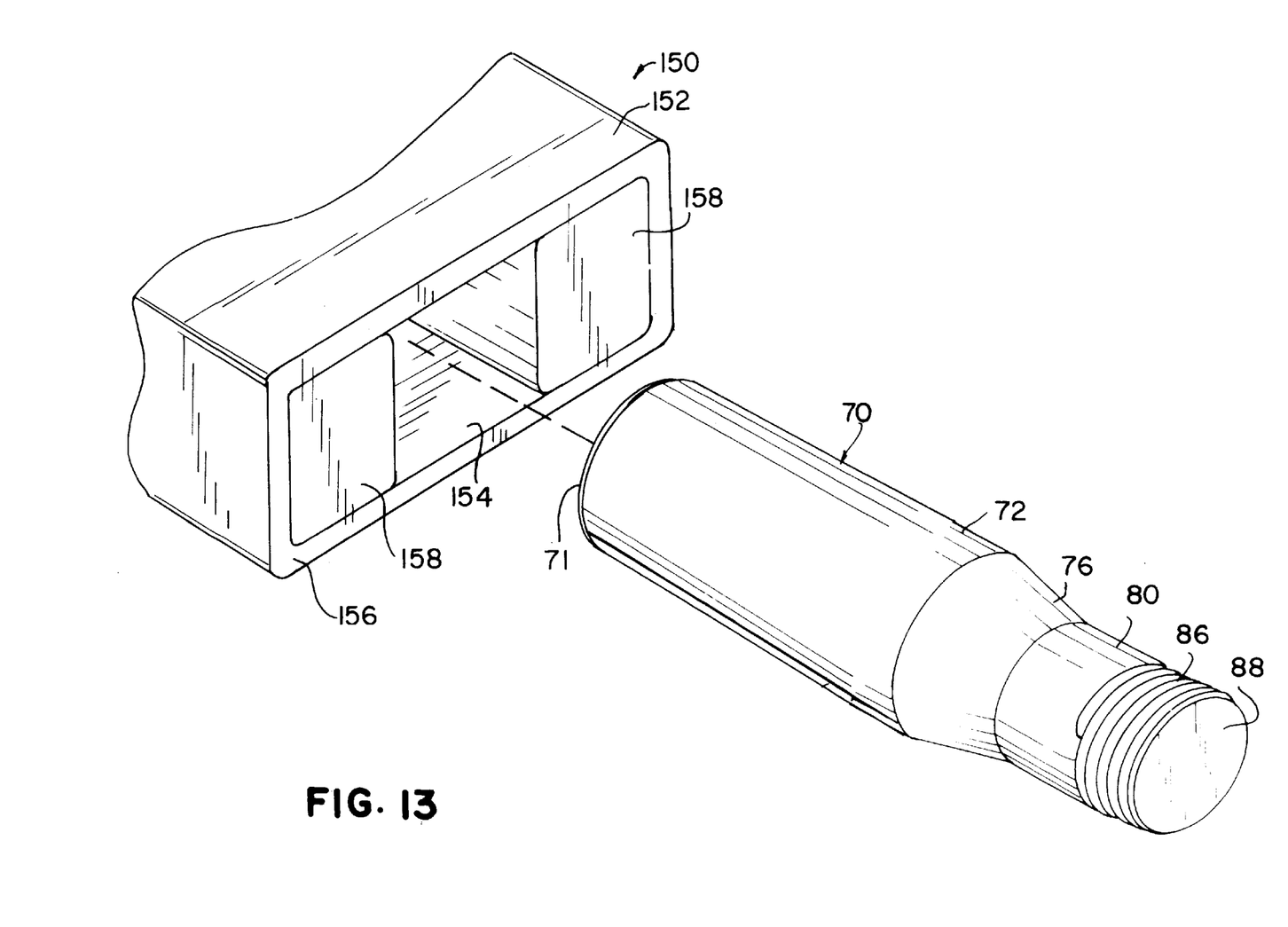
FIG. 13 illustrates yet another type of axle assembly undergoing repair in accordance with the present invention.

FIG. 13 illustrates a third preferred embodiment repaired axle assembly in which the axle undergoing repair has a rectangular shaped axle housing 150. The housing provides an outer surface 152, an inner surface 154, and a resulting cut face 156. In this third preferred embodiment, one or more spacers 158 are inserted into the interior region of the axle housing 150. The spacers 158 are sized such that when a replacement spindle 70, either by itself or in conjunction with a sleeve 90, is inserted within the housing 150 through the cut face 156, the spindle 70 is engaged therein. That is, the spacers 158, when inserted within the housing 150 define an access span either between opposing faces of respective spacers 158 or between opposing regions of the inner surface 154. The remaining operations of the present invention repair technique are then performed.

Figure 14:
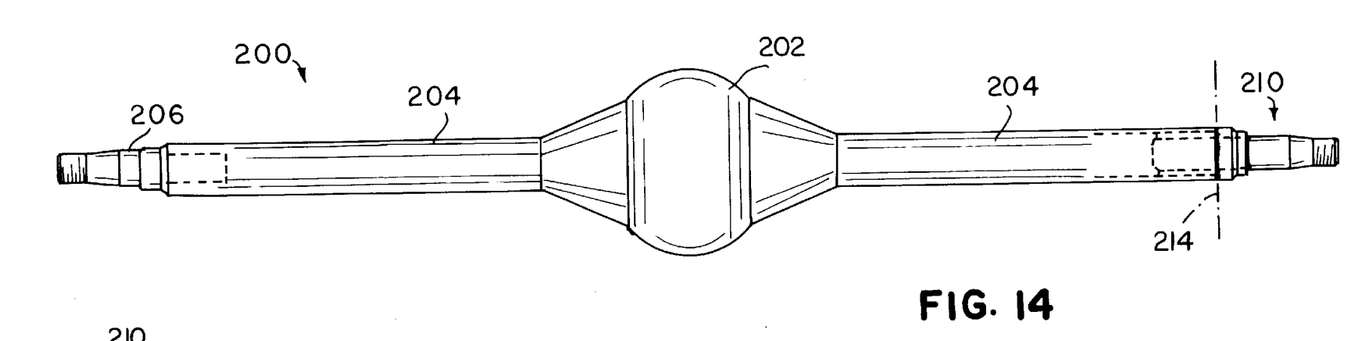
FIG. 14 illustrates a typical vehicle drive axle housing having one end repaired in accordance with the present invention.

The present invention further provides a technique and related assembly for repairing one or both ends of a vehicle drive axle. FIG. 14 illustrates a typical vehicle drive axle housing 200 typically utilized in one ton truck chassis. The drive housing 200 includes a differential housing 202 and oppositely extending hollow axle housings 204, each axle housing 204 providing a housing end 206. FIG. 14 illustrates one of the housing ends after repair in accordance with the present invention, designated as a preferred embodiment repaired housing end 210. Each housing end 206 and 210 provides a hollow region or opening providing access to the interior of the respective axle housing 204. It will be understood that the drive axle housing 200 receives two drive axles (not shown) that extend from within the differential housing 202, at which they engage a gear train, through a respective axle housing 204, through a housing end 206 and/or 210, and project outwardly therefrom, at which they engage a respective wheel or hub.

Figure 15:
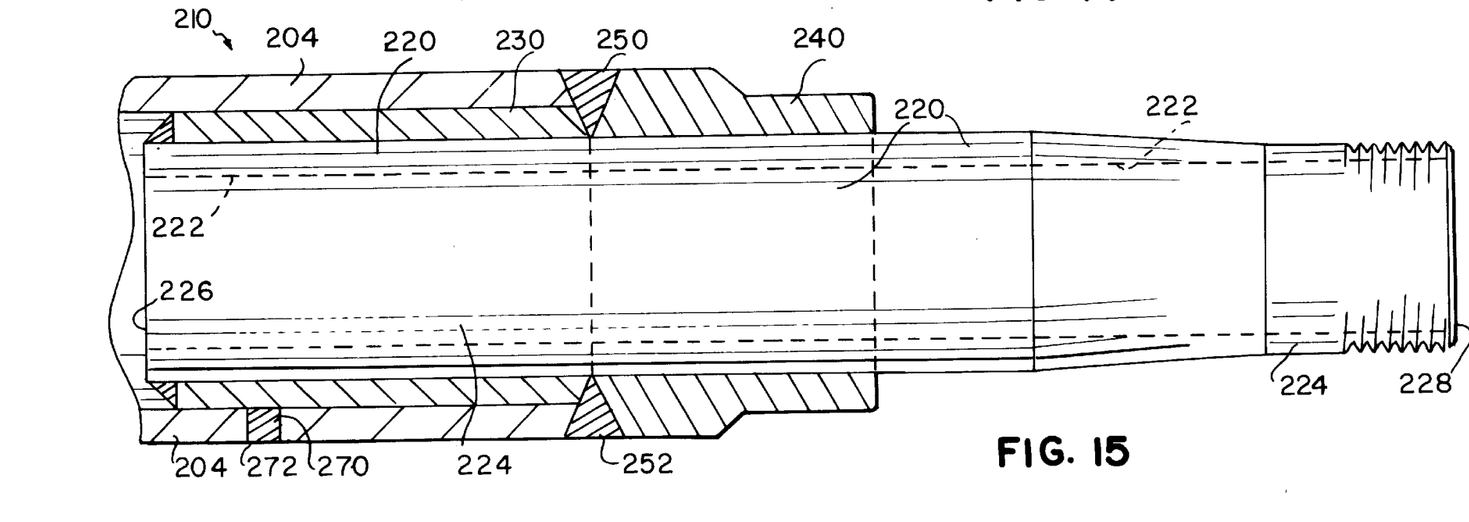
FIG. 15 is a detailed partial cross-sectional view of the repaired end of the vehicle drive axle housing illustrated in FIG. 14.

FIG. 15 illustrates in greater detail the repaired housing end 210 of the drive axle housing 200 depicted in FIG. 14. In accordance with a preferred embodiment repair technique, a damaged portion from the housing end 206 is removed by severing the end 206 from the main portion of the drive axle housing 200 along a cut plane 214 shown in FIG. 14. Typically, drive axle housings such as the housing 200 utilize generally cylindrical axle housings 204 that taper or terminate at a narrowing distal end, at which is located or defined, a spindle. The cut plane 214 is preferably defined as close as possible to the region of the axle housing 204 at which taper or narrowing begins.

Referring to FIG. 15, once the damaged end portion has been removed, a replacement spindle 220, a sleeve 230, and a seal 240 are provided and assembled with the cut end of the axle housing 204 in a similar fashion as the previously described repaired trailer axle assembly 130. It is necessary that when repairing drive axle housings, that the replacement spindle, such as the spindle 220, have an interior surface 222, preferably circumferential, that defines a passage 224 extending from a first end 226 to a second, opposite end 228 of the spindle 220. The drive axle (not shown) extends through the passage 224 and delivers power from the drive gear train disposed within the differential housing 202 to the drive wheels.

Essentially, the replacement spindle 220 and the sleeve 230 are positioned within the axle housing 204 as previously described with respect to the trailer axle repair technique. The seal 240 is positioned over the replacement spindle 220 and placed against the cut end of the axle housing 204. Once properly positioned, the seal 240 is butt welded to the end of the axle housing 204. A butt weld 250 region is formed by depositing an effective amount of weld material 252 along the interface between the seal 240 and end of the axle housing 204. As also previously described, one or more plug welds 270 are provided to secure the sleeve 230 and/or the spindle 220, within the axle housing 204. The plug welds 270 are formed as previously described, that is by forming holes or passages through the walls of the axle housing 204, and optionally through the sleeve 230, and depositing an effective amount of weld material 272 within the passages.

The present inventor has identified two considerations for properly positioning a replacement spindle within an axle housing in accordance with the present invention. These considerations apply to repairing both trailer axles and drive axles. The first consideration is the proportion of the spindle length that is inserted within an axle. In the present invention assembly, a preferred range of ratios for (i) the length of spindle that is inserted within an axle housing to (ii) the total spindle length, is from about 2:18 to about 4:14, and most preferably from about 3:18 to about 3:14. A second consideration is the spindle length that is inserted within an axle compared to the inside diameter or access span of the axle housing. In the present invention assembly, a preferred ratio of (i) the length of spindle that is inserted within an axle housing to (ii) the inside diameter of the housing is from about 0.75:1 to about 1-1/2:1, and most preferably about 1:1.

A significant advantage of the repair technique of the present invention is that a spindle having a standard size, i.e. the outer diameter of the spindle portion that is inserted within a cut axle undergoing repair, may be used to repair a wide array of axles having housings of different size, by utilizing the spindle in combination with one of several sleeves, each sleeve having a different wall thickness and/or diameter. Thus, a single standardized spindle is utilized to repair a wide variety of axles by utilizing the spindle in combination with an appropriate sleeve. This practice avoids the necessity for supplying and stocking numerous spindles, each having particular dimensions corresponding to the various types of axles. Additionally, this practice also obviates the requirement of boring the end of an axle to size the interior region of the axle for accommodating a replacement spindle. In some instances, it may be possible to repair a damaged axle without the sleeve, if the outer diameter of the replacement spindle is approximately equal to, but slightly less than, the interior diameter or access span of the axle housing.

A wide array of steels may be utilized for the replacement spindles. The present inventor has found the following steels to be well suited: SAE 4130 cold drawn, stretch relieved, annealed steel; hot 4140 finished steel; 4140/4142 quenched and tempered steel; and most preferably hot finished 4140/4142 normalized steel.

The sleeve component may be formed from numerous metals, however, the following have been found well suited. Preferably, cold drawn 1020 and cold drawn 1020 welded and mandrel drawn steel are employed.

Regarding the seal components, the preferred materials are hot finished steels such as 4140 or hot finished carbon steel 1020 or 1024.

It is to be understood that the foregoing noted steels are exemplary. The present invention spindles, sleeves, and seals may be formed from a wide array of other steels or alloys. Furthermore, the present invention includes spindles, sleeves, and seals formed from other materials besides steels.

Although not wishing to be bound to any particular sizes, the spindle, sleeve, and seal components described herein typically have certain dimensions. For instance, the outside dimension of the replacement spindles, and thus the interior dimension of the sleeves and seals typically range from about 1 inch to about 4 inches. The interior dimension of the cylindrical hollow region within the replacement spindle is about 1 inch. The total length of replacement spindles typically ranges from about 12 inches to about 20 inches and preferably from about 14 inches to about 18 inches. In the completed repaired axle assembly, such as the axle assembly 130, a typical distance between the seal face 114 and the distal end 88 of the spindle is from about 7 inches to about 8 inches, and typically about 7 ¾ inches. A typical seal width is about 1 ¼ inch.

The sleeve and replacement spindle are inserted within the interior region of the axle housing. This may be accomplished by driving these components into the axle housing with a hammer or other object. It may be preferred to heat the axle housing to expand and facilitate insertion of the spindle and sleeve components. Typically, such components are initially retained in the axle housing by a friction or interference fit. The tolerance between the interior bore of the housing and the exterior diameter of the sleeve, or outer diameter of the spindle if a sleeve is not employed, is generally in the range of from about 0.015 to about 0.020 inches. These are preferred maximum dimensions for this tolerance.

Axle housings typically have a cylindrical inner bore or cavity having an inner diameter generally of at least about 3 ½ inches. The interior bore may be as great as 5 or more inches. It is to be understood that these dimensions are exemplary, and in no way limit the scope or application of the present invention.

While the foregoing details are what is felt to be the preferred embodiments of the present invention, no material limitations to the scope of the claimed invention are intended. Further, features and design alternatives that would be obvious to one of ordinary skill in the art are considered to be incorporated herein. The scope of the invention is set forth and particularly described in the claims herein below.

What is claimed is:

1. A method for repairing an axle housing in need of repair, said axle housing comprising (i) a housing portion having an inner surface defining an interior hollow region and (ii) a damaged spindle defined at an end of said housing portion, said method comprising:

defining a cut plane along said housing portion, said cut plane intersecting said interior hollow region;

severing said damaged spindle from said housing portion along said cut plane to form a cut face on an end of said housing portion through which said interior hollow region is accessible;

providing a replacement spindle having a main body and a spindle portion, said replacement spindle defining a first end proximate said main body and a second end opposite from said first end, said second end proximate said spindle portion;

inserting said first end and at least a portion of said main body of said replacement spindle through said cut face on said end of said housing portion and into said interior hollow region of said housing portion;

inserting at least one spacer into said interior hollow region of said housing portion and between said inner surface of said housing portion and said replacement spindle;

forming at least one passageway through said housing portion proximate to said first end of said replacement spindle; and welding said replacement spindle within said housing portion.

2. The method of claim 1 wherein said welding said replacement spindle within said housing portion is performed by plug welding through said at least one passageway.

3. The method of claim 1 wherein said axle housing is a trailer axle housing.

4. The method of claim 1 wherein said axle housing is a drive axle housing including a differential housing disposed between two said housing portions.

5. A method for repairing an axle housing in need of repair, said axle housing comprising (i) a housing portion having an inner surface defining an interior hollow region wherein said interior hollow region of said housing portion defines an access span and (ii) a damaged spindle defined at an end of said housing portion, said method comprising:

defining a cut plane along said housing portion, said cut plane intersecting said interior hollow region;

severing said damaged spindle from said housing portion along said cut plane to form a cut face on an end of said housing portion through which said interior hollow region is accessible;

providing a replacement spindle having a main body and a spindle portion, said replacement spindle defining a first end proximate said main body and a second end opposite from said first end, said second end proximate said spindle portion and said main body of said replacement spindle having an outer diameter less than said access span;

providing a cylindrical sleeve defining a cylindrical opening extending between a first annular end and a second annular end of said sleeve, said sleeve having an outer diameter less than said access span of said housing portion and an inner diameter greater than said outer diameter of said main body of said replacement spindle;

inserting said first end and at least a portion of said main body of said replacement spindle through said cut face on said end of said housing portion and into said interior hollow region of said housing portion;

inserting said sleeve through said cut face of said housing portion and into said interior hollow region of said housing portion such that said sleeve is disposed between said main body of said replacement spindle and said housing portion;

forming at least one passageway through said housing portion proximate to said first end of said replacement spindle;

forming at least one passageway through said sleeve and aligned with said at least one passageway through said housing portion; and welding said replacement spindle within said housing portion.

6. The method of claim 5 wherein said first annular end of said sleeve is disposed proximate to said first end of said replacement spindle.

7. The method of claim 5 wherein said second annular end of said sleeve is disposed proximate to said cut face of said housing portion.

8. A method for repairing an axle housing in need of repair, said axle housing comprising (i) a housing portion having an inner surface defining an interior hollow region and (ii) a damaged spindle defined at an end of said housing portion, said method comprising:

defining a cut plane along said housing portion, said cut plane intersecting said interior hollow region;

severing said damaged spindle from said housing portion along said cut plane to form a cut face on an end of said housing portion through which said interior hollow region is accessible;

providing a replacement spindle having a main body and a spindle portion, said replacement spindle defining a first end proximate said main body and a second end opposite from said first end, said second end proximate said spindle portion;

inserting said first end and at least a portion of said main body of said replacement spindle through said cut face on said end of said housing portion and into said interior hollow region of said housing portion;

providing a seal having a first end, a second end, and defining a generally cylindrical opening extending between said first end and said second end;

inserting said spindle portion of said replacement spindle through said opening defined in said seal; and positioning said seal about said replacement spindle disposed in said housing portion so that said first end of said seal contacts said cut face of said housing portion;

forming at least one passageway through said housing portion proximate to said first end of said replacement spindle; and welding said replacement spindle within said housing portion.

9. The method of claim 8 further comprising:

welding said seal to said housing portion.

10. A method for repairing an axle housing in need of repair, said axle housing comprising (i) a housing portion having an inner surface defining an interior hollow region, said housing portion having a noncircular cross-section and (ii) a damaged spindle defined at an end of said housing portion, said method comprising:

defining a cut plane along said housing portion, said cut plane intersecting said interior hollow region;

severing said damaged spindle from said housing portion along said cut plane to form a cut face on an end of said housing portion through which said interior hollow region is accessible;

providing a replacement spindle having a main body and a spindle portion, said replacement spindle defining a first end proximate said main body and a second end opposite from said first end, said second end proximate said spindle portion;

inserting said first end and at least a portion of said main body of said replacement spindle through said cut face on said end of said housing portion and into said interior hollow region of said housing portion;

inserting at least one spacer adapted to fit between said inner surface of said housing portion and said replacement spindle;

forming at least one passageway through said housing portion proximate to said first end of said replacement spindle; and welding said replacement spindle within said housing portion.

11. An axle assembly comprising:

an axle housing having a distal end, an exterior surface, and an inner surface defining an interior hollow region accessible from said distal end;

a sleeve having a first end, a second end, an exterior surface extending between said first end and said second end, and an interior chamber extending between said first end and said second end, said sleeve disposed within said axle housing such that said exterior surface of said sleeve is adjacent to said inner surface of said housing;

a spindle member having a main body portion and a spindle portion, said spindle member disposed within said axle housing and said interior chamber of said sleeve such that said spindle portion extends outward beyond said distal end of said axle housing;

wherein said axle housing and said sleeve define at least one passageway extending from said exterior surface of said axle housing to said spindle member disposed within said axle housing and said sleeve; and an effective amount of welding material deposited in said at least one passageway.

12. The axle assembly of claim 11 wherein said spindle member has a total length and is inserted within said housing an insertion distance, the ratio of said insertion distance to said total length ranging from about 2:18 to about 4:14.

13. The axle assembly of claim 12 wherein said ratio ranges from about 3:18 to about 3:14.

14. The axle assembly of claim 11 wherein said interior hollow region defines an access span and said spindle is inserted within said hollow region of said axle housing an insertion distance, said insertion distance and said access span being in a ratio to each other ranging from about 0.75:1 to about 1-1/2:1.

15. The axle assembly of claim 11 wherein said axle housing is a drive axle housing comprising a differential housing.

16. An axle assembly comprising:

an axle housing having a distal end, an exterior surface, and an inner surface defining an interior hollow region accessible from said distal end;

a sleeve having a first end, a second end, an exterior surface extending between said first end and said second end, and an interior chamber extending between said first end and said second end, said sleeve disposed within said axle housing such that said exterior surface of said sleeve is adjacent to said inner surface of said housing;

a spindle member having a main body portion and a spindle portion, said spindle member disposed within said axle housing and said interior chamber of said sleeve such that said spindle portion extends outward beyond said distal end of said axle housing;

a seal component having a first end, a second end, and an interior throughway extending between said first end and said second end, said seal component disposed around said spindle member and in abutment with said distal end of said axle housing;

wherein said axle housing and said sleeve define at least one passageway extending from said exterior surface of said axle housing to said spindle member disposed within said axle housing and said sleeve; and an effective amount of welding material deposited in said at least one passageway.

17. An axle assembly produced by a method comprising:

providing an axle assembly having a housing including a distal end and an inner surface defining an interior hollow region accessible from said distal end;

providing a spindle having a main body and a spindle portion, said spindle defining a first end proximate said main body and a second end proximate said spindle portion;

inserting said first end and at least a portion of said main body of said spindle into said interior hollow region of said housing;

inserting a spacer in said interior hollow region of said housing and between said inner surface and said spindle;

forming at least one aperture through said housing to expose said main body of said spindle through said aperture; and welding said spindle within said housing, said welding including depositing welding material into said at least one aperture.

18. The axle assembly of claim 17 wherein said axle assembly is a drive axle and said housing comprises a differential housing.

19. An axle assembly produced by a method comprising:

providing an axle assembly having a housing including a distal end and an inner surface defining an interior hollow region accessible from said distal end;

providing a spindle having a main body and a spindle portion, said spindle defining a first end proximate said main body and a second end proximate said spindle portion;

inserting said first end and at least a portion of said main body of said spindle into said interior hollow region of said housing;

inserting a sleeve between said main body of said spindle and said inner surface of said housing;

forming at least one aperture through said housing to expose said main body of said spindle through said aperture and forming at least one passageway in said sleeve, said at least one passageway being aligned with said at least one aperture in said housing; and welding said spindle within said housing, said welding including depositing welding material into said at least one aperture and depositing welding material into said at least one passageway in said sleeve.

* * * * *